(12) United States Patent
Yokota

(10) Patent No.: US 6,744,504 B2
(45) Date of Patent: Jun. 1, 2004

(54) LIGHT ANALYZER

(75) Inventor: Kazumi Yokota, Osaka-fu (JP)

(73) Assignee: Shimadzu Corporation, Kyoto (JP)

( * ) Notice: Subject to any disclaimer, the term of this patent is extended or adjusted under 35 U.S.C. 154(b) by 1 day.

(21) Appl. No.: 09/948,586

(22) Filed: Sep. 10, 2001

(65) Prior Publication Data

US 2002/0030821 A1 Mar. 14, 2002

(30) Foreign Application Priority Data

Sep. 8, 2000 (JP) .......................................... 2000-273200

(51) Int. Cl.[7] ................................................. G01J 3/427
(52) U.S. Cl. ......................................... 356/319; 356/326
(58) Field of Search ................................. 356/319, 326, 356/434, 323, 325; 250/343, 347, 351, 555; 702/25

(56) References Cited

U.S. PATENT DOCUMENTS 4,577,106 A  *  3/1986  Fukasawa et al. ............. 250/347
4,583,853 A  *  4/1986  Maeda et al. .................. 356/323
5,815,263 A  *  9/1998  Sakai ............................. 356/323

* cited by examiner

Primary Examiner—Richard A. Rosenberger
Assistant Examiner—Vincent P. Barth
(74) Attorney, Agent, or Firm—Kanesaka & Takeuchi

(57) ABSTRACT

Time-divisionally-multiplexed light receiving signals are sampled at a predetermined time interval as they are, and then converted into digital data. Then, address is determined based on an index signal as a standard of the time-divisional multiplexing, and the data are sequentially stored in a data memory. When the data are sequentially read out, change of quantity of the data is obtained to determine a period having the smallest change in quantity as an effective period. Then, the data included in the effective period are selected and separated to a sample side beam, reference side beam and cutoff period. Thus, the multiplexed light receiving signals are accurately separated by the digital data.

7 Claims, 2 Drawing Sheets

LIGHT ANALYZER

BACKGROUND OF THE INVENTION AND RELATED ART STATEMENT

The invention relates to a light analyzer as a double beam type spectrophotometer having two-systematic optical paths, such as a sample side beam and a reference side beam. The light analyzer includes an optical path structure for introducing a measuring light including plural states into a light-sensitive detector by subjecting the measuring light to time-division multiplexing or intensity modulation.

For example, in a double beam-type ultraviolet visible light spectrophotometer, light irradiated from a light source is introduced into a spectroscope to take out a monochromatic light having a specific wavelength, and the monochromatic light is alternately distributed as a sample side beam and a reference side beam by a rotation sector mirror or the like. After the respective beams have passed through a sample cell and a reference cell, they enter a single light-sensitive detector, so that photoelectric transfer is made to take out electric signals. The rotation sector mirror is provided with a portion, which intercepts light as the mirror is rotated, and an output of the light-sensitive detector corresponding to the portion becomes a zero signal z, so that a ratio $(s-z)/(r-z)$ of an electric signal r with respect to a light quantity of the reference side beam and an electric signal s with respect to a light quantity of the sample side beam becomes a measured result. Or, with the interception of the light, a zero signal $z_s$ corresponding to the sample side beam and a zero signal $z_r$ corresponding to the reference side beam can be obtained, respectively, and $(s-z_s)/(r-z_r)$ may be the measured result.

More specifically, in the device having the above structure, the output of the light-sensitive detector is in a time-divisional-multiplexed state of the signal r, signal s and zero signal z (or $z_s$ and $z_r$). Also, in view of the input of the light-sensitive detector, it can be assumed that the sample side beam containing information relative to the sample cell, the reference side beam containing information relative to the reference cell and the cutoff period are applied, i.e. time-divisionally-multiplexed. In the conventional device, after the time-divisionally-multiplexed light signals thus received are separated by an analog switch, i.e. demultiplexer, respectively, they are inputted into an analog-digital converter (hereinafter referred to as "A/D converter"), separately, to convert into digital values. Also, there has been known a structure that, instead of the A/D converter, a voltage-frequency converter (hereinafter referred to as "V/F converter") is used, and output signals of the V/F converter are counted for a predetermined period to thereby obtain the digital values.

In the above structure, it is unavoidable that the output signals are changed when the signals are selectively switched by the analog switch. Therefore, when the digital values are subjected to the data processing, for example, there is required a troublesome process such that the samples immediately before and after changing the analog switch must be removed. Also, a signal for determining the switch timing of the analog switch is required to be produced in synchronization with the rotation of the sector mirror. Therefore, while a position detecting mechanism attached to the sector mirror or a motor for rotating the sector mirror is used, due to an error of the attaching position, accuracy of the signal switching is low.

Further, for example, since a dynamic range in the order of 20 bits is required in a self-registering spectrophotometer, the converting bit number of the A/D converter is necessary to be higher than 20 bits. While the high performance A/D converter as described above is generally expensive, the above-described conventional structure requires a plurality of the A/D converters, and this results in a high cost. Also, in case the plural A/D converters do not have the uniform characteristics, a measuring error occurs. Thus, a selection of the A/D converter is limited.

Incidentally, in addition to the double-beam-type spectrophotometer as described above, for example, in a light-sensitive analyzer having an optical path structure wherein the light is turned on or off, i.e. when widely speaking, intensity is modulated, by allowing beam to periodically intercept by using, for example, a chopper, there is also the same problem.

In view of the above defects, the present invention has been made, and an object of the invention is to provide a light-analyzer having an optical path structure, wherein measuring light is time-divisionally-multiplexed or modulated, and a signal process portion can be structured by a single A/D converter without using an analog switch.

Another object of the invention is to provide a light-analyzer as stated above, wherein the time-divisionally-multiplexed light signals can be, accurately and entirely, separated without influence of the attaching position of a position detecting mechanism for detecting a rotation position of a sector mirror or a chopper.

Further objects and advantages of the invention will be apparent from the following description of the invention.

SUMMARY OF THE INVENTION

In order to attain the above objects, according to the invention, there is provided a light-analyzer having an optical path structure wherein a plurality of beams and/or cutoff periods are periodically obtained, i.e. time-divisionally-multiplexed, and introduced into a single light detector. The light-analyzer includes: a converting device for sampling outputs detected by the light-sensitive detector at a predetermined time interval and converting the sampled outputs to digital data; a reference signal generating device for generating a signal in synchronization with a period of the sampled outputs, i.e. the time-division-multiplexing; a memory device for storing the digital data; a data write controlling device for generating an address corresponding to a cycle of the time-division-multiplexing or at least allowing the cycle to be identified by using the reference signal, and sequentially storing the digital data into the memory device; and a data separating device for separating the digital data corresponding to the plural beams and/or cutoff periods by using the address or further determining the read-out digital data values when the digital data stored in the memory device are read out.

The "plural beams" mentioned herein means, for example, the sample side beam and the reference side beam in the double-beam-type device.

Also, a specific example of the "plural beams and/or cutoff periods are periodically time-divisionally-multiplexed" is considered such a case that, for example, two beams are alternately selected, or a part or parts of one beam or two beams are cutoff, by a rotation sector mirror or a chopper. In this case, the reference signal generating device generates a signal in synchronization with the rotating period of the sector mirror or the chopper.

DETAILED DESCRIPTION OF PREFERRED EMBODIMENTS

Hereunder, a spectrophotometer as an embodiment of a light analyzer according to the invention is explained with reference to the accompanying drawings.

Figure 1:
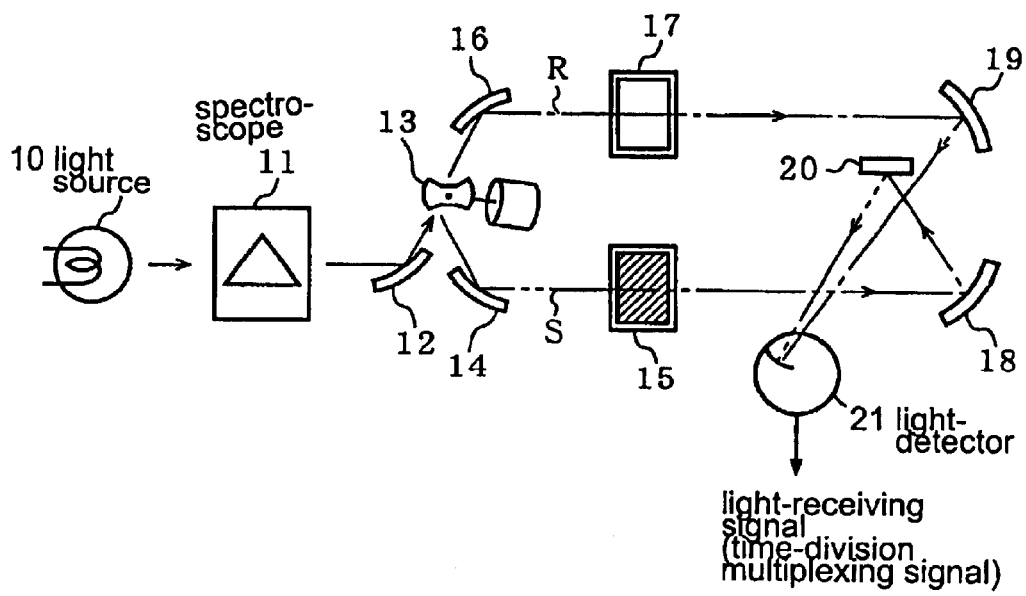
FIG. 1 is a block diagram for showing an optical path structure of a double beam type spectrophotometer of an embodiment according to the invention.
Figure 2:
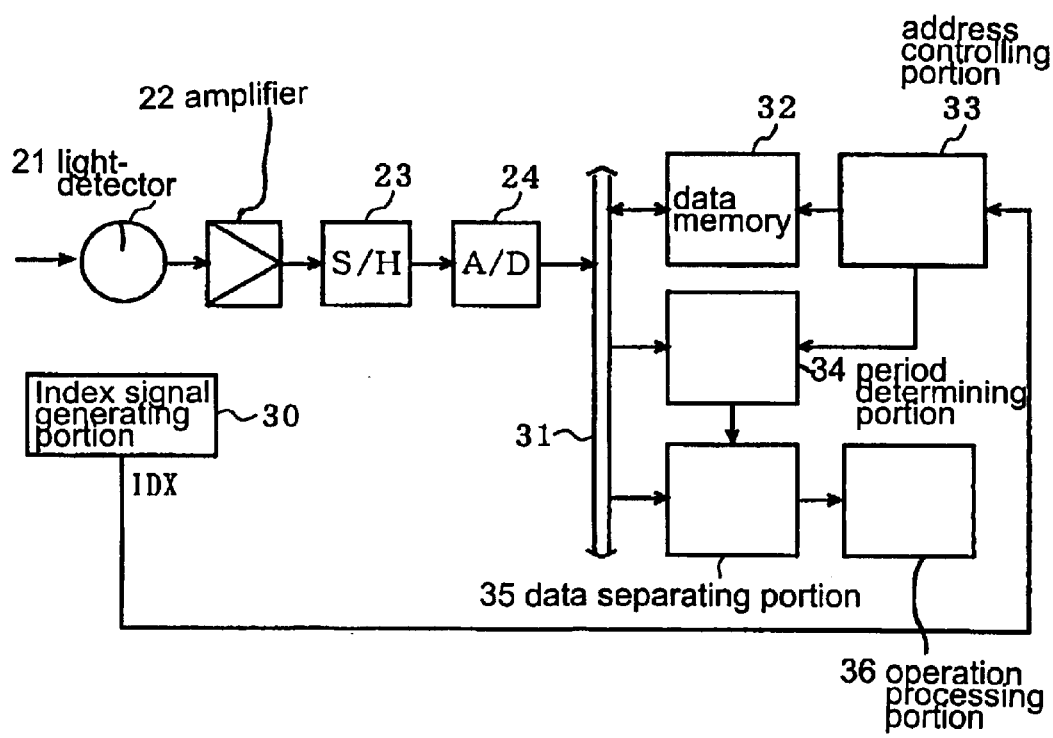
FIG. 2 is a block diagram showing an essential part of a signal processing portion of the spectrophotometer of the embodiment.

FIG. 1 is a block diagram showing an optical path structure of a double beam type spectrophotometer according to the embodiment; and FIG. 2 is a block diagram showing a structure of an essential part of a signal processing portion of the spectrophotometer. As shown in FIG. 1, light irradiated from a light source 10 enters a spectroscope 11, where a monochromatic light having a desired wavelength is taken out. The monochromatic light is sent to a sector mirror 13 by a reflecting mirror 12 and is divided into two beams as a sample side beam S and a reference side beam R by the sector mirror 13. Also, the sector mirror 13 is provided with a light cutoff portion, whereby a beam cutoff period is alternately created between the periods that the sample side beam S and the reference side beam R are formed. The sample side beam S is irradiated to a sample cell 15 through the reflecting mirror 14, and the light passing through the sample cell 15 is sent to a light receiving surface of a light-sensitive detector 21 through reflecting mirrors 18, 20. On the other hand, the reference side beam R is irradiated to a reference cell 17 through a reflecting mirror 16, and the light passing through the reference cell 17 is sent to the light receiving surface of the light detector 21 through a reflecting mirror 19.

Figure 3:
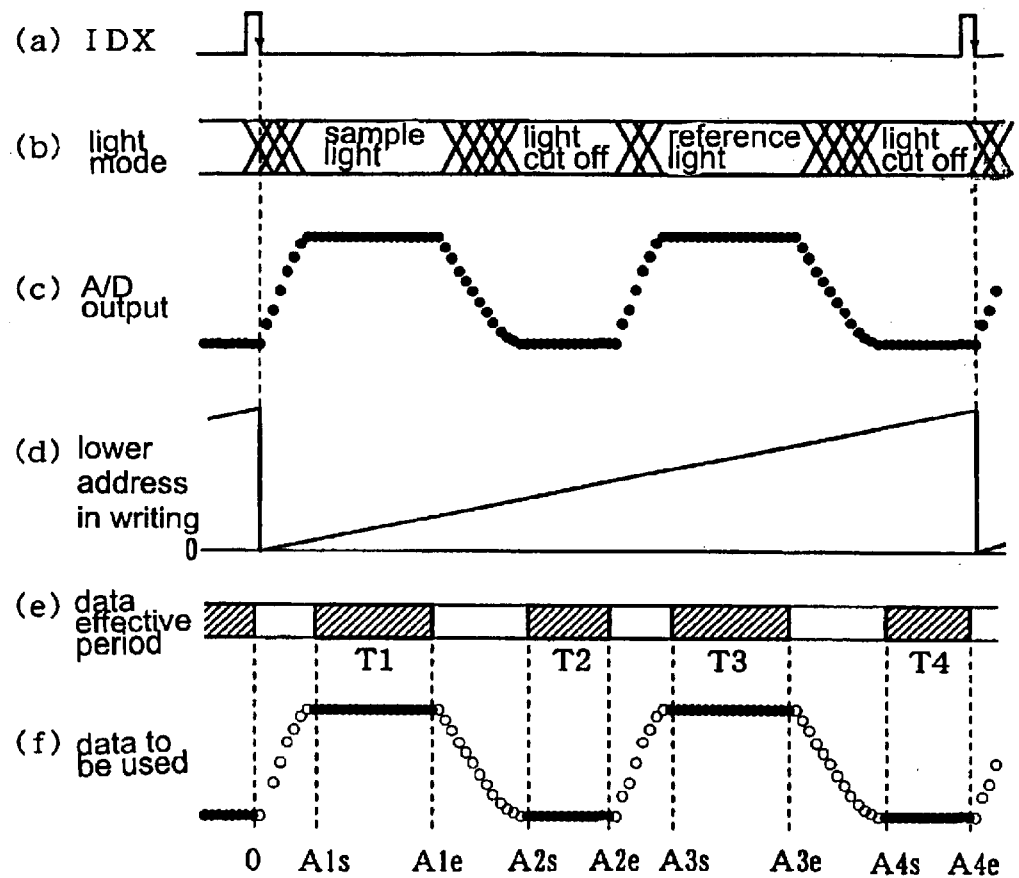
FIG. 3 is a timing chart for explaining operations of the spectrophotometer of the embodiment.

FIG. 3 is a timing chart for explaining an operation of the spectrophotometer. As described above, the sample side beam passing through the sample cell 15 and the reference side beam passing through the reference cell 17 alternately arrive at the light receiving surface of the light detector 21, and the beam cutoff period is provided between the arrival periods of both beams (Refer to FIG. 3(b)). More specifically, the chart shows a state that a plurality of light beams and the beam cutoff periods are periodically provided or time-divisionally multiplexed.

As shown in FIG. 2, an output signal of the light-sensitive detector 21 is amplified by an amplifier 22, then sampled by a sample hold (hereinafter referred to as "S/H") circuit 23 at a predetermined time interval, and the held voltage is converted into a digital voltage value by an analog-to-digital (hereinafter referred to as "A/D") converter 24 (refer to FIG. 3(c)). The digital data are stored in a data memory 32 through a data bus 31. The index signal generating portion 30 generates an index signal IDX of one pulse per rotation in synchronization with the rotation of the sector mirror 13 rotated at a predetermined speed (refer to FIG. 3(a)). For example, a rotation cycle of the sector mirror 13 is a frequency in synchronization with a power supply frequency, so that a frequency, such as 50 Hz or 60 Hz or twofold or one half thereof, is employed. The index signal IDX is inputted into an address controlling portion or data write controller 33 for controlling writing and reading address in the data memory 32.

Figure 4:
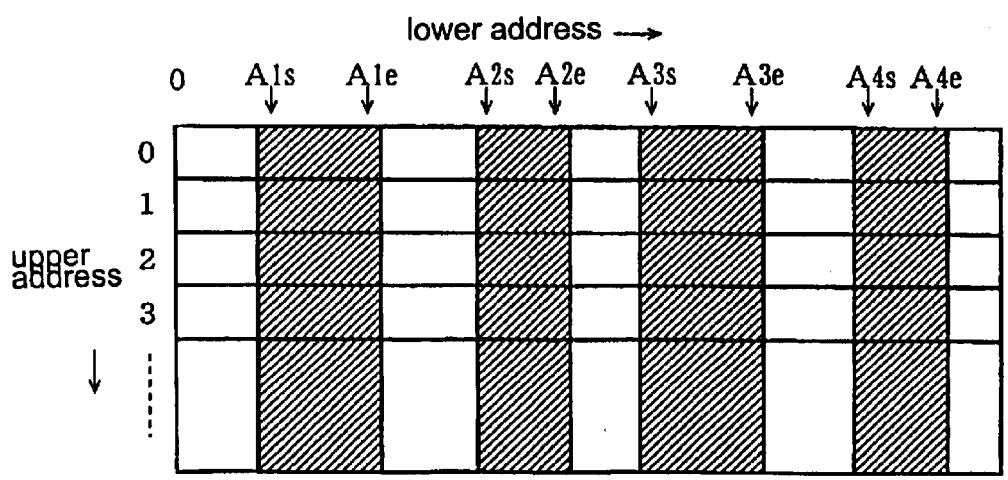
FIG. 4 is a graph showing an example of storing areas in a data memory of the spectrophotometer of the embodiment.

The amount of the digital data obtained in a generating interval period of the index signal IDX is known by the generating interval (i.e. a rotation cycle of the sector mirror 13) of the sampling frequency at the S/H circuit 23 and the index signal IDX. Thus, by considering a margin caused by a rotational irregularity of the sector mirror 13, an amount of a memory region capable of storing all the digital data obtained during the generating interval period of the index signal IDX is determined in advance, so that an address with respect to the memory region can be cyclically assigned whenever the index signal IDX is obtained. More specifically, in the embodiment, as shown in FIG. 3(d), the lower address becomes zero whenever the index signal IDX is inputted, and the lower address is increased whenever one digital datum is written. Also, the upper address is increased whenever the index signal IDX is inputted. Thus, the digital data subjected to the A/D conversion are all sequentially stored in the memory region of the data memory 32 as shown in FIG. 4. In FIG. 4, the memory region of a horizontal row is a region for storing data obtained during the generating interval period of the index signal IDX.

As described above, after all the data are stored in the data memory 32, when the data process is carried out to obtain a permeability and so on by using the data, the following process can be carried out.

An address control portion 33 generates an address to read out the data in the same order as those of the data writing. The read-out data are inputted to a period determining portion 34 and a data separating portion 35, in parallel, through the data bus 31.

The period determining portion 34 watches a change of quantity of the continuously inputted data values, and defines that a time point when the change of quantity of the data becomes within a predetermined value is a beginning point of an effective period; a time point when the change of quantity of the data becomes above the predetermined value is a terminal point of the effective period; and a period where the values of the continuous data are stable is the effective period. For example, with respect to the data as shown in FIG. 3(c), the regions shown by T1, T2, T3 and T4 in FIG. 3(e) are determined as the effective periods. Since it is known which is the beginning of one rotation cycle of the sector mirror 13 in the four effective periods according to an address at a time of a reading-out, light modes of the four effective periods can be decided, respectively.

The information relating to the effective periods is supplied to the data separating portion 35, and the data separating portion 35 selects only the data in the effective periods among the read-in data, identifies a light mode the data belong and sends the data to the operation processing portion 36. In other words, at this point, the data are demultiplexed. The operation processing portion 36 processes the data corresponding to the sample side beam, reference side beam and the light cutoff period according to a predetermined algorithm, respectively, to thereby obtain the permeability.

According to the structure of the embodiment, since all the data obtained at the time of measuring are stored in the data memory 32, when the effective period is determined, the optimum determining condition can be obtained by changing the determining condition, i.e. in the above description, the criterion for determining the change of quantities of the continuous data.

Incidentally, in the above embodiment, while the processes of the period determining portion 34 and the data separating portion 35 can be carried out by CPU, they may be formed of a hardware logic using FPGA and the like.

The above description is only an example, and it is apparent that various modifications and amendments can be made within the subject of the invention. For example, the light-analyzer of the invention can be applied not only to a double-beam type spectrophotometer but also to a fluorometer having a structure wherein the light is periodically passed or cut off by a chopper or shatter to be introduced into the light-sensitive detector.

As described above, according to the light-analyzer of the invention, a plurality of beams and/or beam cutoff periods are periodically time-divisionally multiplexed and introduced into a single light-sensitive detector, and the outputs of the light-sensitive detector corresponding thereto are not separated at an analog signal stage. The outputs are converted into digital data by the A/D converter and all the data are once stored in the memory device. Then, when the data are read out from the memory device, the data are separated as the data corresponding to the plurality of beams and/or beam cutoff periods. Therefore, as in the conventional analyzer, an analog switch for separating the signals is not required, which results in preventing the problem of change of the signal before or after the analog switch is operated. Also, since only a high performance A/D converter is required, the cost of the analyzer can be reduced.

Also, according to the light analyzer of the present invention, it is only necessary that the reference signal in synchronization with the rotation cycle of the sector mirror and chopper is obtained, and it is not required to detect all the rotational positions corresponding to incident periods and cutoff periods of the respective beams. Therefore, different from the conventional analyzer, the light analyzer of the invention does not cause the error by the attaching position of a rotational position detecting portion, and can accurately take out data corresponding to the respective periods. Also, since there is employed a structure wherein the respective periods are determined from the values of the data read out of the memory device and the uncertain data, i.e. immediately before and after the switching of the beams and cutoff periods, are removed, extremely reliable data can be obtained. Further, since all the data including the uncertain data immediately before and after the switching of the beams and cutoff periods are stored in the memory device, the necessary and reliable data can be obtained without waste by properly setting the separating conditions and data selecting conditions, later.

While the invention has been explained with reference to the specific embodiments of the invention, the explanation is illustrative and the invention is limited only by the appended claims.

What is claimed is:

1. A light-analyzer for a system for introducing at least one beam periodically into a single light detector, comprising:
    a converting device for sampling outputs detected by the light detector at a predetermined time interval and converting the sampled outputs to digital data;
    a reference signal generator for generating a signal in synchronization with a period of introduction of the beam;
    a memory device electrically connected to the converting device for sequentially storing all the digital data unprocessed;
    a data write controller electrically connected to the reference signal generator for generating an address corresponding to a cycle of the reference signal, and sequentially storing all the digital data converted by the converting device and unprocessed into the memory device according to the address; and
    a data separating device electrically connected to the memory device for separating the digital data corresponding to the outputs based on the address when the digital data stored in the memory device are read so that desired unprocessed data are obtained when required.

2. A light-analyzer according to claim 1, further comprising a period determining portion electrically connected to the memory device and the data separating device for determining digital data values when the digital data stored in the memory device are read.

3. A light-analyzer according to claim 2, wherein said period determining portion watches a change of quantity of continuously inputted data from the memory device, and defines that a time point when the change of quantity of the data becomes within a predetermined value is a beginning point of an effective period; a time point when a change of quantity of the data becomes above a predetermined value is a terminal point of the effective period; and a period during which values of the data are stable is the effective period.

4. A light-analyzer according to claim 3, further comprising an operation processing portion connected to the data separating device for processing the data transferred from the data separating device.

5. A light-analyzer according to claim 1, wherein said reference signal generator generates a pulse signal in synchronization with one rotation of a sector mirror of the system for introducing at least one beam.

6. A light-analyzer according to claim 5, wherein said data write controller assigns to a plurality of digital data obtained in said one rotation of the sector mirror an address of a memory region in the memory device cyclically whenever the signal from the reference signal generator is obtained.

7. A light-analyzer according to claim 6, wherein the data write controller operates such that a lower address becomes zero whenever an index signal of the reference signal generator is inputted; the lower address is increased whenever one digital datum is written; and an upper address is increased whenever the index signal is inputted so that the digital data subjected to the conversion are all sequentially stored in the memory region of the data memory.

* * * * *